United States Patent
Hochi et al.

(10) Patent No.: US 8,962,758 B2
(45) Date of Patent: Feb. 24, 2015

(54) THERMOPLASTIC ELASTOMER COMPOSITION AND MEDICAL RUBBER PRODUCT

(75) Inventors: Kazuo Hochi, Kobe (JP); Yasuhisa Minagawa, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 13/616,593

(22) Filed: Sep. 14, 2012

(65) Prior Publication Data

US 2013/0137825 A1 May 30, 2013

(30) Foreign Application Priority Data

Nov. 25, 2011 (JP) ................................. 2011-257874

(51) Int. Cl.
*C08F 8/00* (2006.01)
*C08L 23/00* (2006.01)

(52) U.S. Cl.
USPC .......................................... 525/191; 525/240

(58) Field of Classification Search
USPC .................................. 525/191, 240
See application file for complete search history.

(56) References Cited

U.S. PATENT DOCUMENTS

| 7,655,728 B2 * | 2/2010 | Nadella et al. ................. 525/191 |
| 2008/0200615 A1 * | 8/2008 | Niemark et al. ............... 525/240 |
| 2010/0249296 A1 | 9/2010 | Kimura et al. |

FOREIGN PATENT DOCUMENTS

| JP | 2000-212338 A | 8/2000 |
| JP | 2009-102615 A | 5/2009 |
| WO | WO 2007/119687 A1 | 10/2007 |

* cited by examiner

*Primary Examiner* — Nathan M Nutter
(74) *Attorney, Agent, or Firm* — Birch, Stewart, Kolasch & Birch, LLP

(57) ABSTRACT

The present invention aims to provide a dynamically-crosslinked thermoplastic elastomer composition that can provide a molded product exhibiting low compression set especially in the case of being cooled under stress. The present invention relates to a thermoplastic elastomer composition, including a dynamically-crosslinked butyl rubber and a thermoplastic resin; and having a thermoplastic resin content of not more than 8% by mass. The dynamically-crosslinked butyl rubber is preferably a halogen-containing butyl rubber.

6 Claims, No Drawings

THERMOPLASTIC ELASTOMER COMPOSITION AND MEDICAL RUBBER PRODUCT

TECHNICAL FIELD

The present invention relates to a thermoplastic elastomer composition with excellent cleanability, and a medical rubber product produced from the composition.

BACKGROUND ART

Medical rubber products are required to have high cleanability. Specifically, "Test for Rubber Closure for Aqueous Infusions" of Japanese Pharmacopoeia defines the criteria including, for example, that a predetermined amount or more of a substance such as, for example, zinc should not be detected when the product is subjected to elution with pure water. A crosslinking reaction with an added crosslinking agent is used for molding common crosslinkable rubber compositions. However, this brings unwanted detection of substances including crosslinking activators such as a crosslinking accelerator or decomposed products thereof, and decomposed products of the polymer in the elution test. Therefore, application of crosslinkable rubber compositions especially containing zinc to medical rubber products is limited a great deal.

On the other hand, not requiring chemical crosslinking, thermoplastic elastomer compositions (TPE) do not contain crosslinking agents, crosslinking accelerators and other crosslinking activators, unlike crosslinkable rubber compositions. Therefore, substances derived from these agents are not eluted. In addition, thermoplastic elastomer compositions can be molded by the same molding method used for thermoplastic resins and the resulting molded products do not need a finishing step (e.g. deburring, punching) which is needed for the molded products of crosslinkable rubber compositions, and therefore not only hygienic molding but also an economic advantage is achieved.

However, since the thermoplastic elastomer compositions do not have chemical crosslinking points, they exhibit compression set at high temperatures significantly greater than those of chemically crosslinked rubber compositions, and are disadvantageously inferior in the thermal resistance. In particular, since medical rubber products are often subjected to sterilization such as autoclave sterilization, use of thermoplastic elastomer compositions that have high compression set and are easily deformed in autoclave sterilization, as materials of medical rubber products is limited.

Dynamically-crosslinked thermoplastic elastomer compositions (TPV) with chemical crosslinking points have low compression set at high temperatures and are excellent in the thermal resistance, compared with the above-mentioned thermoplastic elastomer compositions having no chemical crosslinking points. For example, TPV dynamically crosslinked by a triazine compound has been proposed (Patent Literature 1).

However, if a dynamically-crosslinked thermoplastic elastomer composition is used for a gasket of an injection syringe, then during sterilization such as autoclave sterilization, the gasket is held at high temperatures while being closely in contact with the inner wall surface of the cylinder, under compressive strain. Therefore, the stress of the gasket to the wall surface is easily relaxed, disadvantageously resulting in lowering the pressure to the wall surface. Moreover, cooling after the sterilization makes the gasket contract to lower the pressure to the wall surface, deteriorating the sealing performance. As a result, problems such as liquid leakage are likely to occur.

CITATION LIST

Patent Literature

Patent Literature 1: JP-A 2009-102615

SUMMARY OF INVENTION

Technical Problems

The present invention aims to provide a thermoplastic elastomer composition that can provide a molded product exhibiting low compression set especially in the case of being cooled under stress.

Solution to Problem

The present invention relates to a thermoplastic elastomer composition, including a dynamically-crosslinked butyl rubber and a thermoplastic resin; and having a thermoplastic resin content of not more than 8% by mass.

The dynamically-crosslinked butyl rubber is preferably a halogen-containing butyl rubber.

The dynamically-crosslinked butyl rubber is preferably produced by dynamically crosslinking 100 parts by mass of a rubber component by 0.1 to 10 parts by mass of a triazine derivative.

The thermoplastic resin is preferably an olefin resin.

The thermoplastic elastomer composition preferably further includes a softener in an amount of 0 to 100 parts by mass per 100 parts by mass of a rubber component of the dynamically-crosslinked butyl rubber.

The softener is preferably paraffin oil or liquid polybutene.

The present invention also relates to a medical rubber product, especially a gasket for an injection syringe, which is produced by molding the thermoplastic elastomer composition.

Advantageous Effects of Invention

The thermoplastic elastomer composition of the present invention can provide a molded product exhibiting low compression set especially in the case of being cooled under stress, because it contains a dynamically-crosslinked butyl rubber and a thermoplastic resin; and having a thermoplastic resin content reduced as much as possible, namely to not more than 8% by mass.

DESCRIPTION OF EMBODIMENTS

The thermoplastic elastomer composition of the present invention contains a dynamically-crosslinked butyl rubber and a thermoplastic resin; and having a thermoplastic resin content of not more than 8% by mass.

The thermoplastic resin content is not more than 8% by mass and preferably not more than 6% by mass in 100% by mass of the dynamically-crosslinked thermoplastic elastomer composition (TPV). If the thermoplastic resin content is more than 8% by mass, the compression set (e.g. strain after standing at ambient temperatures for 3 hours subsequent to heat treatment at 120° C. for 22 hours under 25% compression) is likely to be greater. If such a composition is used for a stopcock of an injection syringe, liquid leakage may occur due to reduced stress relaxation. The lower limit of the thermoplastic resin content is not particularly limited, and is preferably not less than 3% by mass and more preferably not less than 4% by mass. If the thermoplastic resin content is less than 3% by mass, the fluidity of such a composition during molding is likely to be lowered, thereby making it difficult to mold the composition into a product.

As the rubber component in the dynamically-crosslinked thermoplastic elastomer composition (TPV), at least one butyl rubber is used as it has excellent barrier properties against liquids such as chemical solutions. Among butyl rubbers, halogen-containing butyl rubbers are preferred because of their high cure rate in dynamic crosslinking. Examples of the halogen-containing butyl rubbers include bromobutyl rubber, chlorobutyl rubber, and brominated isobutylene/p-methylstyrene copolymer (trade name: EXXPRO). In particular, chlorobutyl rubber is preferred because of its fine handleability in the production process.

The thermoplastic resin in the dynamically-crosslinked thermoplastic elastomer composition (TPV) is not particularly limited and may be a conventionally known one. Examples thereof include olefin resins, polyester resins such as polyethylene terephthalate (PET) and polybutylene terephthalate (PBT), and nylon. In particular, olefin resins are preferred because of their high compatibility with butyl rubbers.

Examples of the olefin resins include polyethylene, polypropylene, ethylene-ethyl acrylate resin, ethylene-vinyl acetate resin, ethylene-methacrylate resin, ionomer resin, chlorinated polyethylene, and polystyrene (PS). In particular, polypropylene and polyethylene are preferred, and polypropylene is more preferred. Compared with polyethylene, polypropylene is excellent in the processability because of its fine fluidity. Moreover, polypropylene has a higher melting point than that of polyethylene, so that it can effectively serve to reduce the compression set of the thermoplastic elastomer composition at high temperatures.

A crosslinking agent for the rubber component in the dynamically-crosslinked thermoplastic elastomer composition is preferably a triazine derivative. Examples of the triazine derivative include compounds represented by Formula (1):

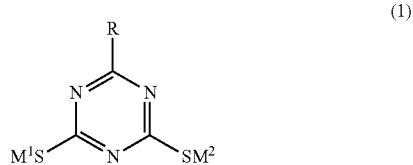

(1)

wherein

R represents —SH, —OR$^1$, —SR$^2$, —NHR$^3$ or —NR$^4$R$^5$ (wherein R$^1$, R$^2$, R$^3$, R$^4$, and R$^5$ each represent an alkyl, alkenyl, aryl, aralkyl, alkylaryl, or cycloalkyl group, and R$^4$ and R$^5$ may be the same as or different from each other), M$^1$ and M$^2$ each represent H, Na, Li, K, ½Mg, ½Ba, ½Ca, an aliphatic primary, secondary or tertiary amine, or a quaternary ammonium or phosphonium salt, and M$^1$ and M$^2$ may be the same as or different from each other.

Examples of the alkyl group in Formula (1) include $C_{1-12}$ alkyl groups such as methyl, ethyl, n-propyl, isopropyl, n-butyl, isobutyl, tert-butyl, n-pentyl, isopentyl, tert-pentyl, n-hexyl, 1,1-dimethylpropyl, octyl, isooctyl, 2-ethylhexyl, decyl, and dodecyl groups. Examples of the alkenyl group include $C_{1-12}$ alkenyl groups such as vinyl, allyl, 1-propenyl, isopropenyl, 2-butenyl, 1,3-butadienyl, and 2-pentenyl groups. The aryl group may be a monocyclic or fused polycyclic aromatic hydrocarbon group, and examples thereof include $C_{6-14}$ aryl groups such as phenyl, naphtyl, anthryl, phenanthryl, and acenaphthylenyl groups. Examples of the aralkyl group include $C_{7-19}$ aralkyl groups such as benzyl, phenethyl, diphenylmethyl, 1-naphthylmethyl, 2-naphthylmethyl, 2,2-diphenylethyl, 3-phenylpropyl, 4-phenylbutyl, 5-phenylpentyl, 2-biphenylylmethyl, 3-biphenylylmethyl, and 4-biphenylylmethyl groups. Examples of the alkylaryl group include $C_{7-19}$ alkylaryl groups such as tolyl, xylyl, and octylphenyl groups. Examples of the cycloalkyl group include $C_{3-9}$ cycloalkyl groups such as cyclopropyl, cyclobutyl, cyclopentyl, cyclohexyl, cycloheptyl, cyclooctyl, and cyclononyl groups.

Specific examples of the triazine derivative represented by Formula (I) include 2,4,6-trimercapto-s-triazine, 2-methylamino-4,6-dimercapto-s-triazine, 2-(n-butylamino)-4,6-dimercapto-s-triazine, 2-octylamino-4,6-dimercapto-s-triazine, 2-propylamino-4,6-dimercapto-s-triazine, 2-diallylamino-4,6-dimercapto-s-triazine, 2-dimethylamino-4,6-dimercapto-s-triazine, 2-dibutylamino-4,6-dimercapto-s-triazine, 2-di(iso-butylamino)-4,6-dimercapto-s-triazine, 2-dipropylamino-4,6-dimercapto-s-triazine, 2-di(2-ethylhexyl)amino-4,6-dimercapto-s-triazine, 2-dioleylamino-4,6-dimercapto-s-triazine, 2-laurylamino-4,6-dimercapto-s-triazine, and 2-anilino-4,6-dimercapto-s-triazine, and sodium or disodium salts of these.

In particular, 2,4,6-trimercapto-s-triazine, 2-dialkylamino-4,6-dimercapto-s-triazines, and 2-anilino-4,6-dimercapto-s-triazine are preferred. From the standpoint of availability, 2-dibutylamino-4,6-dimercapto-s-triazine is particularly preferred.

In the present invention, one triazine derivative may be used alone, or two or more triazine derivatives may be used in combination.

The amount of the triazine derivative is preferably 0.1 to 10 parts by mass per 100 parts by mass of the rubber component. The lower limit is more preferably 0.5 parts by mass, and the upper limit is more preferably 8 parts by mass and still more preferably 5 parts by mass. If the amount of the triazine derivative is less than 0.1 parts by mass, crosslinking of the rubber component tends to be insufficient, giving rise to adherence and deteriorating the abrasion resistance and the like. On the other hand, if the amount of the triazine derivative is more than 10 parts by mass, the residual crosslinking agent is more likely to adversely affect the results of the elution test.

The thermoplastic elastomer composition of the present invention may contain a softener or plasticizer for the purpose of conferring appropriate flexibility and elasticity.

Examples of the softener include paraffinic, naphthenic, or aromatic mineral oils and synthetic oils including hydrocarbon oligomers. Preferred examples of the synthetic oils include oligomers of α-olefin, oligomers of butene, amorphous oligomers of ethylene and α-olefin. The softener is preferably paraffin oil or liquid polybutene as chemical solutions are less likely to be contaminated.

Examples of the plasticizer include phthalate, adipate, sebacate, phosphate, polyether, and polyester plasticizers. More specifically, examples thereof include dioctyl phthalate (DOP), dibutyl phthalate (DBP), dioctyl sebacate (DOS), and dioctyl adipate (DOA). In particular, oligomers of butene are preferred as they are excellent in the compatibility with butyl rubbers.

The amount of the softener and plasticizer is preferably not more than 100 parts by mass, and more preferably not more than 80 parts by mass per 100 parts by mass of the rubber component. If the amount of the softener is more than 100 parts by mass, the softener is likely to bleed out from the surface of the composition and to inhibit crosslinking of the rubber component so that the rubber component can be insufficiently crosslinked, thereby lowering the physical properties. The lower limit of the amount of the softener is not particularly limited, and is preferably not less than 2 parts by mass and more preferably not less than 5 parts by mass. If the amount is less than 2 parts by mass, the effect of adding the softener, namely, the dispersibility of the rubber component in dynamic crosslinking tends to be lowered.

In the thermoplastic elastomer composition of the present invention, a known crosslinking activator may be used for achieving an appropriate crosslinking reaction. Examples of the crosslinking activator include metal oxides. From the standpoint of cleanability, oxides of magnesium or calcium are preferred. The amount of the crosslinking activator may be any amount which allows the rubber component to sufficiently exert its physical properties after crosslinking. In the present invention, the amount may be selected from the range of 0 to 10 parts by mass per 100 parts by mass of the rubber component, according to need.

In the thermoplastic elastomer composition of the present invention, an acid acceptor may be used for the purpose of preventing halogen gas generated in the dynamic crosslinking of the rubber component from remaining in the composition. Various substances functioning as acceptors for acid may be used as the acid acceptor. Preferred examples thereof include carbonates of magnesium or calcium, hydrotalcites, and magnesium oxide. The amount of the acid acceptor is preferably 0.1 to 10 parts by mass and more preferably 0.5 to 8 parts by mass per 100 parts by mass of the rubber component.

In the thermoplastic elastomer composition of the present invention, a filler and the like may be used for the purpose of improving the mechanical strength, according to need. Examples of the filler include powders of silica, carbon black, clay, talc, calcium carbonate, titanium oxide, dibasic phosphites (DLP), basic magnesium carbonate, and alumina. The amount of the filler is preferably not more than 30 parts by mass per 100 parts by mass of the rubber component. If the amount is more than 30 parts by mass, not only the flexibility but also the cleanability tends to be lowered. The lower limit of the amount is preferably 5 parts by mass and the upper limit thereof is more preferably 20 parts by mass.

The dynamically-crosslinked thermoplastic elastomer composition (TPV) may be produced by a process including the steps of: charging an extruder or kneader with a mixture containing a rubber component, a triazine derivative, and a thermoplastic resin; and mixing the rubber component and the thermoplastic resin with a shear force applied thereto while adjusting the temperature at which the triazine derivative can crosslink the rubber component, to dynamically crosslink the rubber component. As another example, the rubber component is preliminary mixed with the triazine derivative with a roller to form a composite and then mixed with the thermoplastic resin, followed by dynamic crosslinking by the above method. These are only examples and the production method is not particularly limited as long as the rubber component is dynamically crosslinked.

The flow beginning temperature of the thermoplastic resin is preferably not higher than 180° C. and more preferably not higher than 175° C. If the flow beginning temperature is higher than 180° C., the moldability of the dynamically-crosslinked thermoplastic elastomer composition (TPV) tends to be lowered.

In the thermoplastic elastomer composition of the present invention, the rubber component is dynamically crosslinked so that chemical crosslinking points are provided, and the content of the thermoplastic resin with thermoplasticity is as small as not more than 8% by mass. Accordingly, the thermoplastic elastomer composition has low compression set at high temperatures and is excellent in the thermal resistance. As a result, even if autoclave sterilization is conducted, the medical rubber product of the present invention is less likely to be deformed and is significantly practical.

In the thermoplastic elastomer composition of the present invention, the use of the triazine derivative as a crosslinking agent allows sufficient crosslinking without using a zinc compound as a crosslinking activator, which offers an advantage from the standpoint of cleanability.

Moreover, the thermoplastic elastomer composition of the present invention can be molded by the same molding method used for thermoplastic resin, and is excellent in the moldability. In addition, a step of finishing (e.g. deburring, punching) molded products is not needed, resulting not only in hygienic molding but also much economic advantage.

The thermoplastic elastomer composition of the present invention can be suitably used especially for medical rubber products. Examples of the medical rubber products include rubber plugs for vials, gaskets for injection syringes (gaskets for syringes, gaskets for prefilled syringes), and sealing members for medical devices.

EXAMPLES

The present invention is specifically described based on examples. However, the present invention is not limited only to these examples.

Hereinafter, chemicals used in Examples and Comparative Examples are listed.
Chlorobutyl rubber: Butyl 1066 produced by Exxon Mobil Corporation
Bromobutyl rubber: Butyl 2255 produced by Exxon Mobil Corporation
Oil 1: Diana Process Oil PW380 (Paraffin oil) produced by Idemitsu Kosan Co., Ltd.
Oil 2: Nisseki Polybutene HV-300 (weight average molecular weight: 1400) produced by JX Nippon Oil & Energy Corporation Filler: talc (MISTRON VAPOR produced by Nihon Mistron Co., Ltd.)
Triazine derivative: 2-di-n-butylamino-4,6-dimercapto-s-triazine (Zisnet DB produced by SANKYO KASEI Co., Ltd.)
Acid acceptor: magnesium oxide (KYOWAMAG 150 produced by Kyowa Chemical Industry Co., Ltd.)
Polypropylene 1: BC6 (flow temperature: 181° C.) produced by Nippon Polychemicals Co., Ltd.
Polypropylene 2: BC05B (flow temperature: 170° C.) produced by Nippon Polychemicals Co., Ltd.

Examples 1 to 9 and Comparative Examples 1 to 2

In accordance with the blending quantities shown in Table 1, components of Material 1 were kneaded with a roller at 80° C. for 4 minutes to give a masterbatch (MB) containing a triazine derivative. Then, the masterbatch was extruded by an extruder at 180° C. to give pellets.

Pellets 1 (Material 1) and Material 2 were mixed in a tumbler and then kneaded with a twin-screw extruder ("HTM38" produced by IPEC Co., Ltd.) at a rotational speed of 200 rpm while being heated at 180° C. to 200° C. so as to carry out dynamic crosslinking. In this manner, pellets (Pellets 2) of a thermoplastic elastomer composition were produced.

The obtained Pellets 2 were injection-molded by a 50-t injection molding machine (produced by Sumitomo Heavy Industries, Ltd.) at 190° C. to 220° C. to give a test sample.

The compositions of Examples and Comparative Examples were evaluated by the following methods. Table 1 shows the evaluation results.

(Moldability)

The appearance of each cylindrical test sample for the compression set test which was molded by the injection molding machine to have a diameter of 29 mm and a height of 12.5 mm was visually checked.

S: Fine appearance
A: Distorted but testable appearance
B: Inappropriate appearance for test because of short shot and deformation caused by poor fluidity (Sealing Performance)

Each injection-molded gasket was mounted on an injection syringe and the whole of the resulting injection syringe was then subjected to heat treatment at 120° C. for 2 hours. After that, the sealing performance of the gasket was evaluated.

A: Properly operable without liquid leakage
B: Inoperable with liquid leakage (Compression Set)

Evaluation was carried out in accordance with JIS K6262. Specifically, each cylindrical test sample with a diameter of 29 mm and a thickness of 12.5 mm was subjected to heat treatment at 120° C. for 22 hours while being compressed to 25% with use of a jig. After standing to cool for 3 hours at ambient temperatures, the test sample was removed from the jig so that the stress was released. The thickness of the test sample was measured 30 minutes after the release of the stress, and the compression set was determined by the method mentioned in JIS K6262.

TABLE 1

| | | | Example No. | | | | | | | | | | | |
|---|---|---|---|---|---|---|---|---|---|---|---|---|---|---|
| | | | Example | | | | | | | | | Comparative Example | |
| | | | 1 | 2 | 3 | 4 | 5 | 6 | 7 | 8 | 9 | 1 | 2 |
| Blending quantity (Parts by mass) | Material 1 | Chlorobutyl rubber | 100 | 100 | 100 | — | 100 | 100 | 100 | 100 | 100 | 100 | 100 |
| | | Bromobutyl rubber | — | — | — | 100 | — | — | — | — | — | — | — |
| | | Oil 1 | — | 20 | 20 | 20 | — | 20 | 20 | 40 | 40 | — | 20 |
| | | Oil 2 | — | — | — | — | 20 | — | — | — | — | — | — |
| | | Filler | — | — | 10 | 10 | 10 | 10 | 10 | 10 | 10 | — | 10 |
| | | Triazine derivative | 2 | 2 | 2 | 2 | 2 | 2 | 2 | 2 | 4 | 2 | 2 |
| | | Acid acceptor | 4 | 4 | 4 | 4 | 4 | 4 | 4 | 4 | 4 | 4 | 4 |
| | Material 2 | Polypropylene 1 | 9 | 9 | 9 | 9 | 9 | — | 7 | 9 | 9 | 12 | 15 |
| | | Polypropylene 2 | — | — | — | — | — | 9 | — | — | — | — | — |
| | | Total | 115 | 135 | 145 | 145 | 145 | 145 | 143 | 165 | 167 | 118 | 151 |
| | | PP content (% by mass) | 7.8 | 6.7 | 6.2 | 6.2 | 6.2 | 6.2 | 4.9 | 5.5 | 5.4 | 10.2 | 9.9 |
| Evaluation on physical properties | | Compresseion set | 35 | 33 | 33 | 35 | 33 | 33 | 31 | 31 | 30 | 50 | 49 |
| | | Moldability | A | S | S | S | S | S | S | S | A | S | S |
| | | Sealing performance | A | A | A | A | A | A | A | A | A | B | B |

The thermoplastic elastomer composition in which the polypropylene content was as low as 10.2% by mass (Comparative Example 1) had high compression set and poor thermal resistance, and also offered poor sealing performance. With regard to the thermoplastic elastomer composition in which the polypropylene content was reduced to 9.9% by mass by addition of 20 parts by mass of oil (Comparative Example 2), the compression set failed to be reduced and the sealing performance was poor.

On the other hand, the rubber compositions of Examples in which the polypropylene content was reduced to not more than 8% by mass had low compression set and excellent moldability, and offered excellent sealing performance.

The invention claimed is:

1. A process for preparing a thermoplastic elastomer composition comprising a dynamically-crosslinked butyl rubber and a thermoplastic resin, which process comprises
   dynamically crosslinking 100 parts by mass of a butyl rubber, in the presence of
     a thermoplastic resin having a content of not more than 6% by mass,
     0.1 to 10 parts by mass of a triazine derivative, and
     0 to 80 parts by mass of a softener,
   thereby reducing the amount of the thermoplastic resin and the softener.

2. The process for preparing a thermoplastic elastomer composition according to claim 1, wherein the dynamically-crosslinked butyl rubber is a halogen-containing butyl rubber.

3. The process for preparing a thermoplastic elastomer composition according to claim 1, wherein the thermoplastic resin is an olefin resin.

4. The process for preparing a thermoplastic elastomer composition according to claim 1, wherein the softener is paraffin oil or liquid polybutene.

5. A process for preparing a medical rubber product, which comprises
   dynamically crosslinking 100 parts by mass of a butyl rubber, in the presence of a thermoplastic resin having a content of not more than 6% by mass, 0.1 to 10 parts by mass of a triazine derivative, and 0 to 80 parts by mass of a softener, thereby reducing the amount of the thermoplastic resin and the softener, and
   molding the thermoplastic elastomer composition obtained by dynamically crosslinking.

6. A process for producing a gasket for an injection syringe, which comprises
   dynamically crosslinking 100 parts by mass of a butyl rubber, in the presence of a thermoplastic resin having a content of not more than 6% by mass, 0.1 to 10 parts by mass of a triazine derivative, and 0 to 80 parts by mass of a softener, thereby reducing the amount of the thermoplastic resin and the softener, and
   molding the thermoplastic elastomer composition obtained by dynamically crosslinking.

* * * * *